Jan. 12, 1960 C. F. SPANG ET AL 2,920,342
GUILLOTINE KNIFE ASSEMBLY
Filed March 27, 1957 2 Sheets-Sheet 1
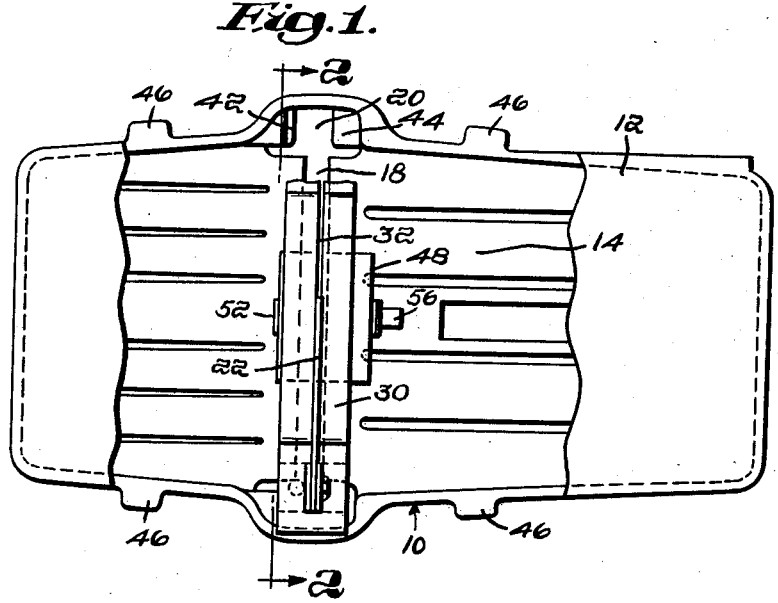
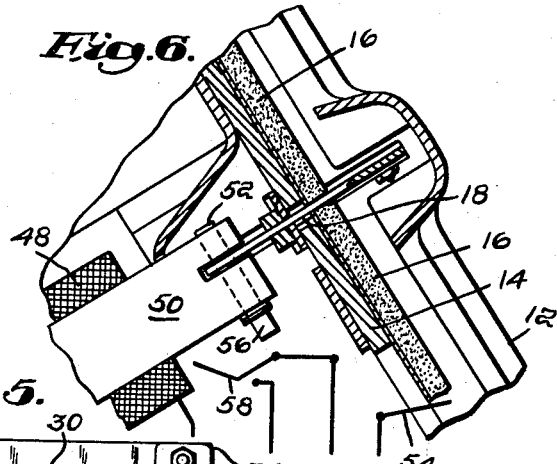
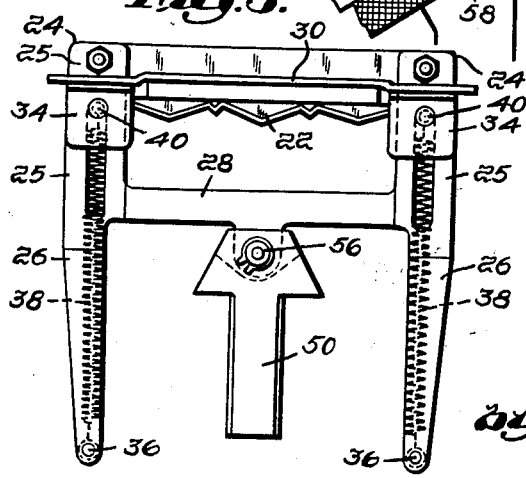
Inventors:
Carl F. Spang,
Wesley E. Lazott,
by Kenway, Jenney, Witter & Hildreth
Attorneys

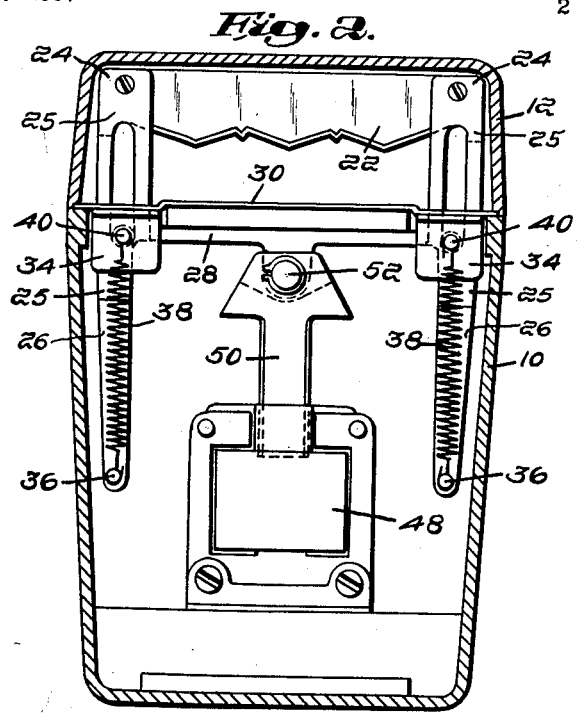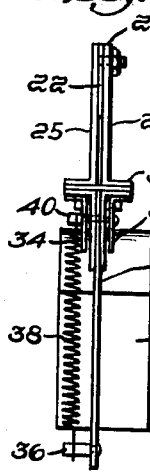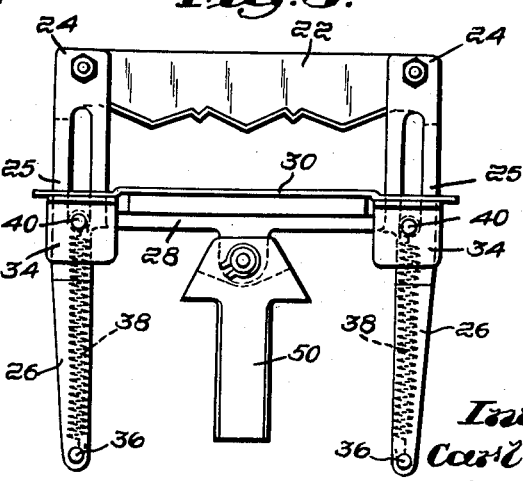

United States Patent Office 2,920,342
Patented Jan. 12, 1960

2,920,342

GUILLOTINE KNIFE ASSEMBLY

Carl F. Spang, Wellesley, and Wesley E. Lazott, Hopkinton, Mass., assignors to Needham Manufacturing Company, Inc., Needham Heights, Mass., a corporation of Massachusetts Application March 27, 1957, Serial No. 648,967

7 Claims. (Cl. 17—32)

This invention relates to a guillotine knife assembly particularly adapted for use in a strip severing machine of the nature shown in Patent 2,795,816, dated June 18, 1957. The knife assembly embodies a guillotine knife normally held in retracted position by resilient means and operative in the cutting direction by a solenoid including a core connected to the knife. The primary object of the invention resides in the novel assembling of these cooperating parts into a single operative unit adapted to be freely placed into and removed from the machine as a unit assembly, thereby substantially simplifying the machine, rendering the assembling and disassembling thereof more rapid and convenient, and making possible quick and easy removal of the knife for cleaning and servicing. The production of a unit assembly of this nature comprises the primary object of the invention.

These and other features of the invention will be best understood and appreciated from the following description of a preferred embodiment thereof selected for purposes of illustration and shown in the accompanying drawings in which:

Fig. 1 is a plan view, partially broken away, of a machine employing the knife assembly, Fig. 2 is a sectional view taken on line 2—2 of Fig. 1, Fig. 3 is a front elevation of the knife assembly, Fig. 4 is a side elevation thereof, Fig. 5 corresponds to Fig. 3 but with the knife blade unit pulled downwardly, and Fig. 6 is a fragmentary sectional view transversely through the knife and illustrating the knife operating mechanism.

In the drawings we have illustrated a machine for severing a strip of material into predetermined lengths, the machine being more fully illustrated and described in the aforementioned patent. The machine embodies a housing including a body portion 10 and a removable cover portion 12. Disposed longitudinally within the body is a tray or platform 14 for receiving and supporting a moving strip 16 to be severed. In the normal operating position of the machine the platform 14 is inclined downwardly as illustrated in Fig. 6. The platform is slotted transversely thereacross at 18 to receive the knife carrying unit and the housing is channeled at 20 to receive the ends of the knife assembly and maintain the assembly in the housing.

The severing knife comprises a blade 22 bolted at each end 24 to and between two plates 25 rigidly secured to the top end of a leg 26 therebetween. The two legs 26 are parallel and rigidly connected by a bar 28 disposed intermittently between the ends of the legs, the legs and bar forming an H-shaped frame. A bridge 30 is slotted at 32 to receive the legs 25—26 and blade 22 and is provided with parallel guiding flanges 34 at opposite faces of the legs 25—26. A stud 36 on the bottom end of each leg is connected by a tension spring 38 to a stud 40 fixed to the adjacent flange 34 and these springs normally hold the blade unit in the raised position of Figs. 2 and 3 in which the bar 28 is in abutting contact with the bridge.

The knife assembly (Fig. 3) is freely removable from and replaceable in the body 10 to the position illustrated in Figs. 1 and 2. In this position the legs 25—26 are confined between the guiding flanges 34 within the channels 20 and the ends of the bridge 30 are seated and supported on abutments 42 and 44. When the cover 12 is replaced on the body 10 it rests on the bridge at its ends and holds it securely on the abutments. The cover 12 is secured to the body 10 by latches at 46.

The springs 38 normally hold the knife in the raised position illustrated in Fig. 2 and a solenoid 48, including a core 50, is provided in the housing for moving the knife downwardly in the strip severing operation. The body 48 of the solenoid is fixed to the housing 10 and the core 50 is pivotally connected to the bar 28 at 52 and hangs loosely therefrom within the solenoid. The strip 16 is continuously fed downwardly on the platform 14 and when it contacts and closes a switch 54 the solenoid is energized and quickly draws the knife downwardly and severs the strip. Immediately following the severing operation, a pin 56 carried by the core 50 engages and closes a switch 58 and thereupon functions through relay mechanism described in the aforementioned patent to deenergize the solenoid, whereupon the springs 38 quickly return the knife to its initial position. The severed unit slides down the platform by gravity and the cutting and return movements of the knife are so instantaneous as not to interfere with the continuous forward movement of the strip.

It is imperative that the knife and its cooperating parts be kept clean and sanitary and the removable knife assembly as illustrated and described particularly serves this function. Furthermore, the novel assembly substantially simplifies the machine and facilitates the assembling and disassembling of its parts and any required servicing of the knife assembly unit.

Having thus disclosed our invention what we claim and desire to secure by Letters Patent is:

1. A guillotine knife assembly comprising an oblong bridge having abutment engaging and supporting portions at its ends and a slot extending longitudinally through the bridge inwardly of its margin, a gullotine knife, a frame having spaced end portions extending through the bridge at the ends of the slot and means rigidly connecting said end portions beneath the bridge, means mounting the knife at its ends on said end portions and in alignment with the slot above the bridge, guide means carried by the bridge and cooperating with said end portions to guide the frame for reciprocating movement in the bridge and the blade toward and from the slot, means including springs cooperating with the bridge and frame for normally holding the frame and blade in raised position with the knife disposed above the slot, and means connected to and depending downwardly from the frame beneath the knife and intermediately between said end portions for cooperating with power means to pull the frame downwardly and the knife into the slot.

2. A guillotine knife assembly comprising an oblong bridge having abutment engaging and supporting portions at its ends and a slot extending longitudinally through the bridge inwardly of its margin, an H-shaped frame including two parallel legs rigidly connected by a bar intermediately between their ends, a guillotine blade connected at its ends to the legs above the bar, said legs being mounted for reciprocation longitudinally thereof through the bridge with the blade in alignment with said slot, means including springs cooperating with the bridge and frame for normally holding the frame and blade in raised position with the knife disposed above the slot, and means connected to and depending downwardly from the bar intermediately of the legs for cooperating with power means to pull the frame downwardly and the knife into the slot.

3. The assembly defined in claim 2 plus guide means carried by said end portions of the bridge for receiving and cooperating with said legs to guide the frme for reciprocatory movement through the bridge longitudinally of the legs and with the blade in said alignment with the slot.

4. The assembly defined in claim 3 in which said means including springs comprises tension springs anchored at their ends to the bridge and the bottom ends of the legs.

5. The assembly defined in claim 2 plus a housing, a strip carrying tray on and within the housing and having a slot therethrough extending transversely thereacross, abutments on the housing at the ends of the slot, said portions of the bridge resting on said abutments and supporting the bridge with the frame extending downwardly through the slot into the housing, and power means in the housing for cooperating with the means connected to and depending downwardly from said bar.

6. The mechanism defined in claim 5 plus means providing guideways in the housing extending downwardly from said abutments, and complementary guide means carried by said end portions of the bridge and extending downwardly into said guideways, said guide means receiving and cooperating with said legs to guide the frame for reciprocatory movement through the bridge longitudinally of the legs.

7. The assembly defined in claim 2 plus an open housing, a strip carrying tray on and within the housing and having a slot therethrough extending transversely thereacross, abutments on the housing at the ends of the slot, said portions of the bridge resting on said abutments and supporting the bridge with the frame extending downwardly through the slot into the housing, power means in the housing for cooperating with the means connected to and depending downwardly from said bar, and a cover on the housing resting on said portions of the bridge and holding them in place on the abutments.

References Cited in the file of this patent

UNITED STATES PATENTS

| | | |
|---|---|---|
| 2,575,068 | Nanna | Nov. 13, 1951 |
| 2,589,347 | Demerath | Mar. 18, 1952 |
| 2,785,748 | Von Stoeser et al. | Mar. 19, 1957 |